E. CHILDREN.
Wheel-Cultivator.
No. 62,004. Patented Feb. 12, 1867.
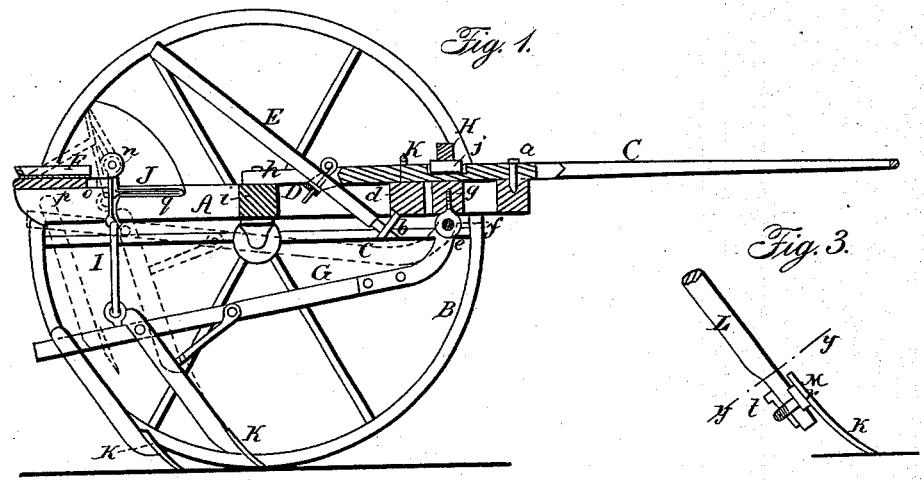
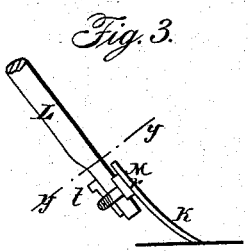
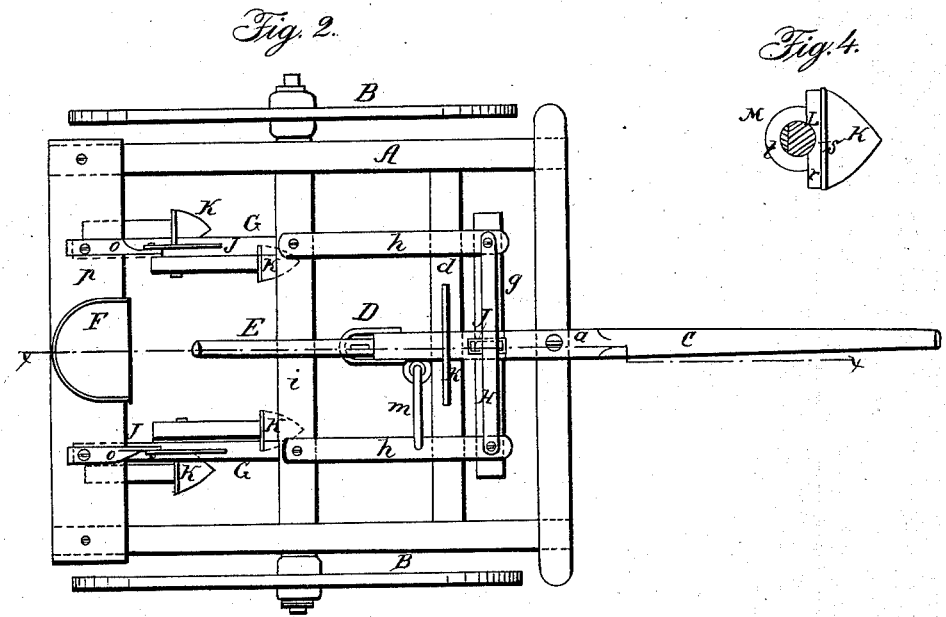
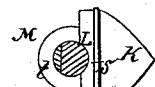
Witnesses:
Theo Tusche
J. A. Service
Inventor:
Edwin Children
Per Munn &Co
Attorneys

United States Patent Office.

EDWIN CHILDREN, OF LANCASTER, WISCONSIN.

Letters Patent No. 62,004, dated February 12, 1867.

---

IMPROVEMENT IN CULTIVATORS.

---

The Schedule referred to in these Letters Patent and making part of the same.

---

TO ALL WHOM IT MAY CONCERN:

Be it known that I, EDWIN CHILDREN, of Lancaster, in the county of Grant, and State of Wisconsin, have invented a new and improved Cultivator; and I do hereby declare that the following is a full, clear, and exact description thereof, which will enable others skilled in the art to make and use the same, reference being had to the accompanying drawings, forming part of this specification.

This invention relates to a new and improved cultivator of that class which have their ploughs connected to a frame mounted on wheels and provided with a pivoted draught-pole. The invention consists in a novel and improved means for raising the plough-beams and retaining them in an elevated position, and also in an improved arrangement of the draught-pole and means of attaching the ploughs to their standards, whereby advantages are obtained, as hereinafter specified. In the accompanying sheet of drawings—

Figure 1 is a side sectional view of my invention taken in the line $x\ x$, fig. 2.

Figure 2, a plan or top view of the same.

Figure 3, a detached side view of a standard and plough pertaining to the same.

Figure 4, a transverse section of fig. 3 taken in the line $y\ y$.

Similar letters of reference indicate like parts.

A represents a rectangular frame which is mounted on two wheels, B B, and has a draught-pole, C, secured to it by a pivot, $a$, as shown in figs. 1 and 2. To the rear end of the draught-pole C there is secured a metal loop, D, through which a lever, E, passes, the lower end of said lever having a metal rod, $b$, attached, which passes through an eye, $c$, at the under side of a cross-piece, $d$, of the frame A, said eye forming a fulcrum for the lever. F is the driver's seat placed on the rear part of the frame A; and G G are two plough-beams, the front ends of which are connected by joints, $e$, to a rod, $f$, at the under side of a bar, $g$, the ends of which are pivoted to two parallel arms, $h\ h$, the rear ends of which are pivoted to a cross-bar, $i$, in the frame, which has the axles of the wheel B secured to it. To the front ends and upper surfaces of the arms $h\ h$ a bar, H, is pivoted, the draught-pole C being between the two bars, $g$ H; and the draught-pole has a friction-roller, $j$, inserted in it, on which the bar H rests. The draught-pole C also passes through a guide, $k$, at the cross-bar $d$ of the frame A, and the rear part of the draught-pole is connected by a link, $m$, with one of the arms $h$, as shown in fig. 2. The rear ends of the plough-beams G G are connected by links, I I, with T-shaped levers, J, which are connected by fulcrum-pins, $n$, to brackets, $o$, on the rear cross-bar $p$ of the frame A. These levers, J, when turned down so that one arm, $q$, extends forward in about a horizontal position, admit of the ploughs penetrating a suitable depth into the earth, as shown in black in fig. 1; and when said arms are raised and turned over backward on the cross-bar $p$, as shown in red in fig. 1, the ploughs will be elevated above the surface of the earth. By this simple means the plough may be readily raised and lowered, and, when raised, securely held in position. By having the draught-poles provided with the friction-roller, and the bar H of the arms $h\ h$ resting upon it, much friction is avoided in turning the machine to the right or left in order that the ploughs may conform to the sinuosities of the rows of plants, the lever E, which is within convenient reach of the driver's seat, being actuated by the driver in order to effect that result. The ploughs K are secured to the lower ends of the standards L by having the lower parts of the same rounded, and a semicircular staple, M, secured to the inner or rear side of each plough, the staples passing through cross-bars, $r$, which have concaves, $s$, made in them, said concaves and the staples forming a complete circle, through which the standards pass, (see fig. 4;) and in order to prevent the ploughs turning casually on the standards, a metal key, $t$, is driven within the staples, between them and the standards. By this simple means the ploughs may be adjusted on the standards obliquely, either to the right or left, to throw the earth to or cast it from the rows of plants, as may be desired.

What I claim as new, and desire to secure by Letters Patent, is—

1. The friction-roller $j$, inserted in the pivoted draught-pole C, in combination with the bar H, attached to the pivoted arms $h\ h$, all arranged to operate in the manner as and for the purpose herein set forth.

2. The links I and T-shaped levers J, applied to the plough-beams and frame A, to operate in the manner substantially as and for the purpose set forth.

3. The securing of the ploughs K to the standards L by means of the staples M, bars $r$, and the keys $t$, all arranged substantially as and for the purpose herein set forth.

The above specification of my invention signed by me this 6th day of December, 1866.

EDWIN CHILDREN.

Witnesses:
WM. F. MCNAMARA,
ALEX. F. ROBERTS.